United States Patent Office 3,012,899
Patented Dec. 12, 1961

3,012,899
METHOD OF PREPARING CADMIUM SULFIDE TELLURIDE PIGMENT
Anthony Giordano, Cleveland, Ohio, assignor to The Harshaw Chemical Company, Cleveland, Ohio, a corporation of Ohio
No Drawing. Filed July 13, 1959, Ser. No. 826,394
7 Claims. (Cl. 106—301)

This invention relates to cadmium sulfide telluride pigments and to the manufacture thereof.

Cadmium sulfide and cadmium sulfide selenide pigments in colors ranging from yellow to dark red have been commercially successful pigments for many years. In the literature relating to cadmium sulfide selenide pigments can be found occasional reference to tellurium, the tellurium references suggesting that the selenium may be substituted with tellurium without any other change in the process. However, there is not as yet, to my knowledge, a commercially successful cadmium sulfide telluride pigment.

German Patent No. 1,007,907 describes a process of calcining cadmium sulfide with a source of tellurium in the manufacture of cadmium sulfide telluride pigments. The German patent, however, does not disclose the improved method for producing these pigments which I have found capable of giving most consistently good results. The German patent falls short especially in two respects: (1) The presence of an excess of free sulfur during calcination, and (2) the presence of an excessive amount of by-product mineralizer, such as, for instance, sodium chloride during calcination operations.

In addition to the improvements over the German patent, it has now been found that an improved pigment can be produced by controlling the particle size of the source of tellurium.

It is, therefore, an object of this invention to produce an improved cadmium sulfide telluride pigment by limiting the amount of free sulfur present during calcination operations.

It is another object of this invention to produce an improved cadmium sulfide telluride pigment by limiting the amount of mineralizer present during calcination operations.

It is still another object of this invention to produce an improved cadmium sulfide telluride pigment by employing a source of tellurium having a critical particle size.

I have found that during calcination of the cadmium sulfide tellurium mixture, the tellurium reaction is highly sensitive to sulfur. The degree of sensitivity is much greater than that exhibited in the cadmium sulfide-selenium reaction. Free sulfur present during calcination of cadmium sulfoselenide reds reduces the efficient utilization of selenium and is, therefore, undesirable, however, it has been found that under similar conditions, tellurium reds will not form at all. It is, therefore, desirable to minimize the amount of sulfur present during the calcination. This can be done in several ways. The presence of sulfur due to use of a reactant $Na_2S$ or $BaS$ in precipitating the CdS which contains excess sulfur is one source of contamination with sulfur. This results from the fact that commercial grade $Na_2S$ or $BaS$ is very likely to contain polysulfide sulfur. For cost reasons such material may have to be used but if so, the polysulfide sulfur contained therein can be counteracted by introducing a part of the cadmium as cadmium oxide, or hydroxide or carbonate, or phosphate so that, on calcination the excess sulfur reacts with a portion of the cadmium oxide or hydroxide or carbonate or phosphate to form the sulfide. Again the reaction during calcination liberates sulfur in an amount which can be tolerated if the sulfide source contains only the stoichiometric amount of monosulfide sulfur. However, it is very difficult to produce a green cake containing no polysulfide sulfur and best results are had consistently by using a precipitant ($Na_2S$ or $BaS$) as nearly free from dissolved or polysulfide sulfur as commercially practicable and also introduce cadmium oxide, cadmium hydroxide, cadmium carbonate or the like to react with any sulfur in the green cake or sulfur which may be liberated during calcination. While it is difficult to determine the amount of free sulfur, it appears that about 0.25% based on the total solids weight of the green cake is the maximum amount of free sulfur which can be tolerated in the calcination process.

The detrimental effect of free sulfur on red pigments compounded from tellurium is believed to be due to the fact that tellurium is less electro-negative than sulfur. The difference in electronegativity results in sulfur preventing the reduction of tellurium metal to telluride ion or in sulfur oxidizing telluride ion to tellurium metal. The failure of tellurium to combine with the cadmium tends to produce a mixture of cadmium sulfide and metallic tellurium which cannot be properly termed a pigment.

It has been found that the presence of excessive amounts of mineralizer salts will inhibit the formation of a red pigment during calcination operations. The presence in the calcination mixture of mineralizer salts, in the range from about 1% to about 4% based on the total solids weight of the green cake, will result in gradual inhibition of the red coloration formation at 1% to complete unresponsiveness to red color formation at 4%. However, these same salts which inhibit the red color formation when present in excessive amounts will act as a catalyst for the red color formation when present in amounts of about 0.5%, based on the total weight of solids in the green cake. Salts which are suitable for use as color catalysts or mineralizers include such salts as ammonium fluoride, sodium and potassium fluoride, and ammonium chloride and sodium and potassium chloride. Ammonium chloride was found to be most desirable of the mineralizers. As mineralizers are present as by-products in the preparation of cadmium sulfide from soluble cadmium salts and soluble sulfide salts, the cadmium sulfide must be washed to reduce the quantity of mineralizer below the critical amount of 1%.

I have also found the particle size of tellurium to be critical. If the tellurium particles are too large, a weak pigment will result due to the failure of tellurium to combine with the cadmium to a sufficient degree. A sufficient surface area of tellurium must be brought into contact with cadmium, otherwise the pigment will have a dark coloration due to the black color of unreacted tellurium. However, if the tellurium particles are too fine and more specifically, if the tellurium particles are colloidal in nature, an undesirable result will also occur. It appears that tellurium particles which are colloidal in size will eventually bond together to produce hard, undispersible aggregates which do not react properly with the cadmium. I have found that tellurium having a particle size from about 0.02 micron to 50 microns will present a sufficient surface area for the purposes of this invention. The preferred range is from 0.02 to 7 microns.

The components of the calcination mixture for the cadmium sulfide telluride pigment of this invention are cadmium sulfide and a source of tellurium. The source of tellurium may be elemental tellurium, tellurium dissolved in part in sodium sulfide solution, tellurous acid derived from tellurium dioxide, and tellurium precipitated from $Na_2TeO_3$ solution with sulfur dioxide, or other reducing agents. The cadmium sulfide may be derived by precipitating from a solution of cadmium chloride and substantially pure or reagent grade sodium sulfide, precipitating cadmium sulfide from a solution of cadmium sulfate and substantially pure or reagent grade sodium sulfide, precipitating cadmium sulfide from cadmium sulfate solution and commercial grade sulfide solution, and precipitating cadmium sulfide from a cadmium chloride solution and a commercial grade sodium sulfide solution.

In general, the cadmium sulfide telluride pigment of this invention may be prepared as follows: An aqueous solution of a soluble cadmium salt is prepared and then mixed with a second aqueous solution of a soluble sulfide salt, thus producing a cadmium sulfide precipitate. The amount of sulfide salt is a stoichiometric amount necessary to react with the amount of cadmium salt present. An aqueous paste consisting of elemental tellurium, which had previously been milled to a particle size in the range of from .02 micron to 50 microns and preferably to a particle size from .02 micron to 7 microns is then added to the cadmium sulfide precipitate. All components are then mixed in a Waring Blendor. The mixture is then flooded with water to wash out undesirable amounts of by-product mineralizer which were formed in the preparation of the cadmium sulfide precipitate. The mixture is then filtered, dried and calcined at a temperature in the range from 550° C. to 675° C.

Certain inovations may be made in the basic procedure without departing from the spirit and scope of this invention. Where due to the reactants employed in the formation of the cadmium sulfide precipitate quantities of free sulfur in excess of the critical amount of 0.25% are produced, certain remedial features may be incorporated into the basic procedure. The excess quantities of free sulfur present may be counteracted by the introduction of cadmium oxide, or any cadmium compound capable of combining with sulfur to form cadmium sulfide and with tellurium to form cadmium telluride in calcination operations, to the aqueous mixture prior to mixing in Waring Blendor. For shades around the medium red range, between 3% and 4% of the total Cd as $Cd(OH)_2$ seems to be optimum.

The following examples and corresponding tables give a more detailed description of the procedure.

A division has been made between pigments of the unextended or C.P. type and pigments of the lithopone type, Table I relating to C.P. pigments while Table II relates to lithopone pigments. The C.P. pigment consists essentially of cadmium sulfide telluride pigment while the lithopone pigments contain in addition to the cadmium sulfide telluride pigment an extender such as barium sulfate.

Example 1

815 grams of cadmium chloride solution containing 1 gram atom of cadmium was mixed with a solution of 240 grams of reagent grade sodium sulfide in 735 ml. of water. To the resultant cadmium sulfide precipitate was added 4.46 grams of an aqueous paste of elemental tellurium, containing 2.81 grams of metal, consisting of tellurium particles of a size range from 0.02 micron to 50 microns. The tellurium paste and cadmium sulfide precipitate was then mixed in a Waring Blendor. The precipitate was flooded in 4 liter beaker, filtered and dried. The pH of the dried product was found to be 8.9. 20 gram charges were then calcined at temperatures at 550° C. for a 20 minute period, 600° C. for a 15 minute period, and 675° C. for a 15 minute period. The colors of the calcined charges were found to range from medium light red to dark red.

Example 2

865 grams of cadmium sulfate solution containing 1 gram atom of cadmium was mixed with 976 grams of $Na_2S$ solution made from 62% fused flake, being careful so as not to use any more $Na_2S$ than necessary to just precipitate the Cd. To the resultant cadmium sulfide precipitate was added 5.35 grams of an aqueous paste of elemental tellurium, containing 3.77 grams of metal, consisting of tellurium particles of a size range from .02 micron to 50 microns. The tellurium paste and cadmium sulfide precipitate were then mixed in a Waring Blendor, washed, filtered, and dried. 20 gram charges were then calcined at a temperature of 575° C. for 15 minutes, 625° C. for 15 minutes, and 650° C. for 15 minutes. The calcined charges were found to range in color from yellow green to orange red.

Example 3

To 1730 grams of $CdSO_4$ solution (13% Cd) was added 1952 grams of 8% $Na_2S$ solution made from 62% fused flake, being careful so as not to use any more $Na_2S$ than necessary to just precipitate the Cd. With vigorous stirring there was added $Cd(OH)_2$ slurry made by adding 12.4 grams of 5% NaOH solution to 86.7 grams of $CdSO_4$ solution (10% Cd), and the mixture flooded twice to remove by-products salts.

7.8 grams of elemental tellurium was ground with a suitable amount of water, so as to bring the particles within a size range from 0.02 to 50 microns. The resulting slurry was then added to above cadmium sulfide-cadmium hydroxide combination, with vigorous agitation. The mixture was filtered and dried overnight.

A 20 grams charge was calcined 15 minutes at 600° C. resulting in a light red color. A second 20 gram charge together with 0.25 gram of ammonium chloride was calcined under the same time-temperature conditions. This produced medium light red, a deeper shade than the first calcination.

Again under the same conditions, a third 20 gram charge was calcined together with 0.25 gram of ammonium bifluoride. This gave a medium red, a deeper color than either of the other two calcinations.

Table I points out the salient features of the various C.P. pigment procedures. Example 1, it should be noted, employs elemental tellurium milled to a size range from 0.02 micron to 50 microns. It should also be noted that Example 1 employs reagent grade sodium sulfide and thereby eliminates the presence of free polysulfides found

TABLE I.—C.P. TYPE PIGMENT

| Example No. | Te/Cd Ratio | Source of Cd | Source of S | Source of Te How Introduced | Calcination Temp., °C. | Calcination Time, Mins. | Color |
|---|---|---|---|---|---|---|---|
| 1 | 2.5/100 | $CdCl_2$ soln. | NaS Reagent Crystal. | Elemental Te (Milled Paste of particle size from .02 to 50 microns). | 550 | 20 | MLR (G) Good Texture. |
| | | | | | 600 | 15 | MR (G). |
| | | | | | 675 | 15 | Dk. R (G) Bur. |
| 2 | 3.0/100 | $CdSO_4$ soln. | $Na_2S$ Fused Flake. | do | 575 | 15 | Y Grn. |
| | | | | | 625 | 15 | O Drt. |
| | | | | | 650 | 15 | OR Drt. |
| | | | | | 600 | 15 | LR. |
| | | | | | 600 | 15 | MLR (Calcined with ammonium chloride). |
| 3 | 3.5/100 | $CdSO_4$ soln. $+Cd(OH)_2$. | do | do | 600 | 15 | MR (Calcined with ammonium bifluoride). |

O = Orange    M = Medium    Dk = Dark    R = Red
Y = Yellow    Grn = Green    Bur. = Burnished—Brittle    EP = End Point
L = Light    Drt. = Dirty    (G) = Good in commercial grades of sodium sulfide. Example 2 produced an inferior pigment due to the release of free sulfur during calcination operations. The free sulfur was due to the use of fused flake sodium sulfide rather than reagent grade sodium sulfide in the preparation of the cadmium sulfide source of cadmium. The poor color obtained in Example 2 is also due to the use of cadmium sulfate which results in the by-product mineralizer sodium sulfate. Sodium sulfate has not been found to be as good a mineralizer as sodium chloride. Experiment 3 counteracted the effect of free sulfur due to the use of fused flake $Na_2S$ by employing $Cd(OH)_2$ and thus producing an acceptable pigment.

TABLE II—LITHOPONE PIGMENTS

| Example No. | Te/Cd Ratio | Source of Cadmium and Sulfur | Precipated Tellurium Source How Introduced | Calcination Temp., °C. | Calcination Time, Mins. | Color |
|---|---|---|---|---|---|---|
| 1-A | 8/100 | $CdS.BaSO_4$ | $Na_2TeO_3$ from $TeO_2$ into NaOH. | 600 | 20 | DR. |
| 2-A | 8/100 | $CdS.BaSO_4$ | $Na_2TeO_3$ from $TeO_2$ into $Na_2S$. | 600 | 15 | MR. |
| 3-A | 8/100 | $CdS.BaSO_4$ | $K_2TeO_3$ from $TeO_2$ into KOH. | 575 / 575 | 15 / 20 | DR. / DR. |
| 4-A | 8/100 | $CdS.BaSO_4$ | CdTe from $TeO_2$ into NaOH, $Na_2TeO_3$ into $CdSO_4$, plus reducing agent. | 650 / 625 / 625 | 15 / 15 / 90 | MR. / MR. / O–Drt. |
| 5-A | 8/100 | $CdS.BaSO_4$ | $H_2TeO_3$ from $TeO_2$ into NaOH—HCl into $Na_2TeO_3$. | 650 / 675 | 15 / 10 | DR. / DR. |
| 6-A | 8/100 | $CdS.BaSO_4$ | $H_2TeO_4$—$H_2O_2$ into $Na_2TeO_3$—HCl into $Na_2TeO_4$. | 700 / 650 / 650 / 650 | 15 / 15 / 15 / 15 | DR. / LR. / MLR. / LR—Brn. |

O=Orange  D=Dark
R=Red  Drt=Dirty
L=Light  Brn=Burnished
M=Medium

Example 1–A 9.3 grams of $TeO_2$ was dissolved in 31.2 grams of 15% sodium hydroxide solution. In a separate container, sufficient 20% sodium hydroxide solution was added to 375 grams of $CdSO_4$ solution, containing 8 grams of cadmium, to precipitate all of the metal. The tellurite solution followed by the cadmium hydroxide slurry were then added to and mixed with 1182 grams of previously prepared cadmium lithopone, containing 302 grams of $CdS.BaSO_4$. The mixture was then acidified with 10% HCl, being careful so as not to dissolve any cadmium precipitate. The resulting slurry was then filtered, and dried.

A 20 gram portion of the green cake was calcined 20 minutes at 600° C. A dark red color resulted.

Example 2–A 9.3 grams of $TeO_2$ was dissolved in 39.5 grams of 15% sodium sulfide solution. In a separate container, sufficient 20% sodium hydroxide solution was added to 375 grams of $CdSO_4$ solution, containing 8 grams of cadmium, to precipitate all of the metal. The tellurite solution followed by the cadmium hydroxide slurry were then added to and mixed with 1182 grams of previously prepared cadmium lithopone, containing 302 grams of $CdS.BaSO_4$. The mixture was then acidified with 10% HCl, being careful so as not to dissolve any cadmium precipitate. The resulting slurry was then filtered, and dried.

A 20 gram portion of green cake was calcined 15 minutes at 600° C. A medium red color resulted.

Example 3–A 11.6 grams of $TeO_2$ was dissolved in 53 grams of 15% KOH solution. In a separate container, sufficient 20% sodium hydroxide solution was added to 375 grams of $CdSO_4$ solution, containing 8 grams of cadmium, to just precipitate all of the metal. The tellurite solution followed by the cadmium hydroxide slurry were then added to and mixed with 1309 grams of previously prepared cadmium lithopone slurry, containing 344.5 grams of $CdS.BaSO_4$. The mixture was then acidified with 10% HCl, being careful so as not to dissolve any cadmium precipitate. The resulting slurry was then filtered and dried.

A 20 gram portion of green cake was calcined 20 minutes at 575° C. A dark red color resulted.

Example 4–A

Stock cadmium telluride slurry was prepared by reacting, first 72.1 grams of sodium hydroxide pellets in 300 mls. of water with 148.4 grams of commercial tellurium dioxide to form sodium tellurite as follows:

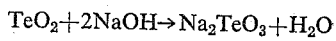

$$TeO_2 + 2NaOH \rightarrow Na_2TeO_3 + H_2O$$

The resulting solution was filtered and added to 575 grams of cadmium sulfate solution, assaying 18.19% as Cd, to form cadmium tellurite precipitate.

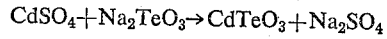

$$CdSO_4 + Na_2TeO_3 \rightarrow CdTeO_3 + Na_2SO_4$$

Next the cadmium tellurite was reduced to cadmium telluride by the addition of 240 grams of sodium hydrosulfite with heating and strong mixing-according to the following reaction:

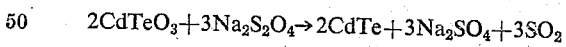

$$2CdTeO_3 + 3Na_2S_2O_4 \rightarrow 2CdTe + 3Na_2SO_4 + 3SO_2$$

The precipitate was washed free of sulfates, and the resulting slurry determined to be 6.18% CdTe. 220 grams of this slurry containing 13.55 grams of CdTe was added to 1010 grams of previously prepared slurry containing 282 grams of cadmium lithopone ($CdS.BaSO_4$) and mixed thoroughly. The mixture was filtered and dried overnight at 190° C.

A 20 gram charge calcined 15 minutes at 650° C. produced a light red. A second 20 gram charge calcined together with 0.1 gram of ammonium chloride, under the same conditions, produced a medium red, a considerably deeper shade than the first calcination.

Example 5–A 11.6 grams of $TeO_2$ was dissolved in 39 grams of 15% sodium hydroxide solution. With stirring, sufficient 10% HCl solution was added to give the mixture a pH value of 6.8. The precipitate was then added to and thoroughly mixed with 1,358 grams of previously prepared cadmium lithopone, containing 378 grams of $CdS.BaSO_4$, and the resulting product allowed to stand for 1½ hours after which it was filtered and dried.

A 20 gram portion of green cake was calcined 15 minutes at 650° C. A dark red color resulted.

Example 6-A 11.6 grams of TeO$_2$ was dissolved in 39 grams of 15% sodium hydroxide solution. While stirring, 9 grams of 30% H$_2$O$_2$ was added slowly. The resulting sodium tellurate solution was then acidified with 10% HCl to a pH of 6.8 thus precipitating out telluric acid. This was then thoroughly mixed with 1,358 grams of previously prepared cadmium lithopone, containing 378 grams of CdS.BaSO$_4$; then filtered and dried.

A 20 gram portion of green cake was calcined for 15 minutes at 650° C. A light red color resulted. A second 20 gram portion of green cake was thoroughly mixed with 0.1 gram of ammonium chloride, and then calcined for 15 minutes at 650° C. A deeper shade, or medium light red, resulted.

Table II discloses six examples of lithopone type pigments. The six examples have been found to produce acceptable pigments because they satisfy certain prerequisite conditions. All of the examples employ a tellurium source derived from a precipitate, although a lithopone type pigment having a red coloration can be produced from elemental tellurium as with the C.P. type pigment. The particle size of the precipitate is in the range from .01 to 5 microns. The cadmium sulfide and barium sulfate are introduced together as a common mixture. Cadmium sulfide introduced in this form is prepared by the following reaction:

$$CdSO_4 + BaS \rightarrow CdS.BaSO_4$$

It should be noted that the reaction results in a product free of mineralizer salts. In contradistinction thereto cadmium sulfide prepared for introduction without lithopone is derived by the following reaction:

$$CdSO_4 + Na_2S \rightarrow CdS + Na_2SO_4$$

When cadmium sulfide from this reaction is employed in a C.P. pigment, the amount of Na$_2$SO$_4$ mineralizer salt present must be reduced. The cadmium sulfide employed in mixture with BaSO$_4$ is not subject to the same free sulfur problems which bother the C.P. type pigment. It appears that the BaSO$_4$ lithopone has a diluting effect which allows the cadmium sulfide-lithopone mixture to tolerate much greater amounts of free sulfur than the cadmium sulfide employed in C.P. type pigments. It is well known in the art that C.P. type pigments are much more sensitive and difficult to produce than lithopone type pigments.

In summary, the lithopone pigments of this invention are acceptable because:

(1) The tellurium source has a particle size from 0.01 to 5 microns.

(2) The lithopone consisting of cadmium sulfide-barium sulfate does not contain excessive amounts of mineralizer, and (3) The cadmium sulfide-lithopone mixture is not as sensitive to free sulfur as the pure cadmium sulfide utilized in a C.P. type pigment.

Having thus described my invention, what I claim is:

1. A process of preparing a red cadmium sulfide telluride pigment by calcining a calcination mixture consisting essentially of cadmium sulfide, a source of tellurium, and a mineralizer component present in amounts of from 0.5% to about 1.0% based on the total solids weight of the finished pigment, said calcination mixture containing an amount of free sulfur not in excess of about 0.25% of total solids weight of the finished pigment, and said source of tellurium being present in a particle size of from about 0.02 micron to about 7 microns.

2. The method of claim 1 wherein the source of tellurium is elemental tellurium.

3. The method of claim 1 wherein the cadmium sulfide is formed by reacting stoichiometric amounts of cadmium chloride with substantially pure sodium sulfide crystals.

4. The process of preparing a red cadmium sulfide telluride lithopone type pigment by calcining a calcination mixture consisting essentially of barium sulfate, cadmium sulfide, a source of tellurium, and a mineralizer component present in amounts of from 0.5% to about 1.0% based on the total solids weight of the finished pigment, said calcination mixture containing an amount of free sulfur not in excess of about 0.25% of total solids weight of the finished pigment, and said source of tellurium being present in a particle size of from about 0.02 micron to about 7 microns.

5. The method of claim 4 wherein the source of tellurium is a tellurium containing precipitate.

6. The process of preparing a red cadmium sulfide telluride pigment by calcining cadmium sulfide with a cadmium compound capable of reacting under calcination conditions with free sulfur to the extent that not in excess of 0.25% by weight of free sulfur will remain in the total solids weight of the finished pigment and a source of tellurium, said cadmium sulfide being precipitated from a technical grade of sulfide selected from the group consisting of Na$_2$S and BaS and said source of tellurium being present in a particle size of from about 0.02 micron to about 7 microns, and wherein prior to calcination operations by-product mineralizers are removed by washing to the extent that from about 0.5% to about 1.0% of soluble mineralizer will remain in the total solid weight of the pigment product.

7. The method of claim 6 wherein the source of tellurium is elemental tellurium.

References Cited in the file of this patent

UNITED STATES PATENTS

| | | |
|---|---|---|
| 2,226,573 | O'Brien | Jan. 29, 1938 |
| 2,248,408 | Juredine | July 8, 1941 |
| 2,367,946 | Kaercher | Jan. 23, 1945 |
| 2,496,587 | Marcot | Feb. 7, 1950 |
| 2,515,721 | Marcot | July 18, 1950 |
| 2,578,363 | Marcot | Dec. 11, 1951 |
| 2,643,196 | Allan et al. | June 23, 1953 |

FOREIGN PATENTS

| | | |
|---|---|---|
| 1,007,907 | Germany | May 9, 1957 |